(12) United States Patent
Liu et al.

(10) Patent No.: US 10,826,325 B2
(45) Date of Patent: Nov. 3, 2020

(54) HYBRID CONTROL APPARATUS AND METHOD

(71) Applicant: x2 Power Technologies Limited, Grand Cayman (KY)

(72) Inventors: Sichao Liu, Shanghai (CN); Jinbiao Huang, Nashua, NH (US); Xintao Wang, Pleasanton, CA (US)

(73) Assignee: x2 Power Technologies Limited, Grand Cayman (KY)

( * ) Notice: Subject to any disclaimer, the term of this patent is extended or adjusted under 35 U.S.C. 154(b) by 257 days.

(21) Appl. No.: 15/901,136

(22) Filed: Feb. 21, 2018

(65) Prior Publication Data
US 2019/0260232 A1 Aug. 22, 2019

(51) Int. Cl.
*H02J 50/12* (2016.01)
*H02M 3/158* (2006.01)
*H02M 3/335* (2006.01)
*H02M 3/337* (2006.01)
*H04B 5/00* (2006.01)
*H02M 1/00* (2006.01)

(52) U.S. Cl.
CPC ............. *H02J 50/12* (2016.02); *H02M 3/158* (2013.01); *H02M 3/337* (2013.01); *H02M 3/33569* (2013.01); *H02M 2001/007* (2013.01); *H02M 2001/0058* (2013.01); *H04B 5/0037* (2013.01)

(58) Field of Classification Search
None
See application file for complete search history.

(56) References Cited

U.S. PATENT DOCUMENTS

2016/0365790 A1* 12/2016 Ye .................... H02M 3/1582
2018/0083490 A1*  3/2018 Oh ........................ H02J 50/12
2018/0294723 A1* 10/2018 Dalena ............... H02M 3/1563
2019/0386570 A1* 12/2019 Xi ..................... H02M 3/33507

* cited by examiner

*Primary Examiner* — Jared Fureman
*Assistant Examiner* — Aqeel H Bukhari
(74) *Attorney, Agent, or Firm* — Slater Matsil, LLP

(57) ABSTRACT

An apparatus comprises a power converter connected between an input power source and a wireless power transfer system, wherein the power converter is configured to regulate a voltage applied to the wireless power transfer system when a load current of the wireless power transfer system is less than a first threshold and the power converter is configured to operate in an always-on mode when the load current of the wireless power transfer system is greater than the first threshold.

20 Claims, 15 Drawing Sheets

HYBRID CONTROL APPARATUS AND METHOD

TECHNICAL FIELD

The present invention relates to a hybrid control method, and, in particular embodiments, to a hybrid control method applied to a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As power consumption has become more important, there may be a need for high power density and high efficiency wireless power transfer systems. Resonant converter based wireless power transfer systems have become the preferred choice for achieving high performance (e.g., lower power losses) because resonant converters are capable of reducing switching losses of power switches through zero voltage switching and/or zero current switching. However, as the frequency of the wireless power transfer system goes higher, achieving a high efficiency power wireless power transfer system under different loading conditions become a significant issue, which presents challenges to the system design of the wireless power transfer system.

It would be desirable to have a wireless power transfer control method exhibiting good behaviors such as high efficiency and low electromagnetic interference (EMI) under a variety of loading conditions.

SUMMARY

These and other problems are generally solved or circumvented, and technical advantages are generally achieved, by preferred embodiments of the present disclosure which provide a wireless power transfer system operating in different control modes in response to different load currents or different loading conditions.

In accordance with an embodiment, an apparatus comprises a power converter connected between an input power source and a wireless power transfer system, wherein the power converter is configured to regulate a voltage applied to the wireless power transfer system when a load current of the wireless power transfer system is less than a first threshold and the power converter is configured to operate in an always-on mode when the load current of the wireless power transfer system is greater than the first threshold.

In accordance with another embodiment, a method comprises detecting a load current of a wireless power transfer system comprising a power converter and a wireless power transfer device connected in cascade between an input power source and a load, configuring the power converter to regulate a voltage applied to the wireless power transfer device when the load current is less than a first current threshold and configuring the power converter to operate in an always-on mode when the load current is greater than the first current threshold.

In accordance with yet another embodiment, a system comprises a converter comprising a high-side switch and a low-side switch connected in series between an input power source and ground, an inductor connected to a common node of the high-side switch and the low-side switch and an output capacitor connected to the inductor.

The system further comprises a wireless power transfer device comprising a full-bridge connected between an output of the converter and ground, a transmitter coil coupled to the full-bridge, a resonant capacitor connected between the full-bridge and the transmitter coil, a receiver coil magnetically coupled to the transmitter coil and a rectifier connected to the receiver coil, wherein the converter is configured to operate in two different operation modes in response to different load currents of the wireless power transfer device.

An advantage of an embodiment of the present disclosure is a hybrid control method applied to a wireless power transfer system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a wireless power transfer system operating in different control modes for increasing transfer efficiency and reducing system costs. The invention may also be applied, however, to a variety of power systems. Hereinafter, various embodiments will be explained in detail with reference to the accompanying drawings.

Figure 1:
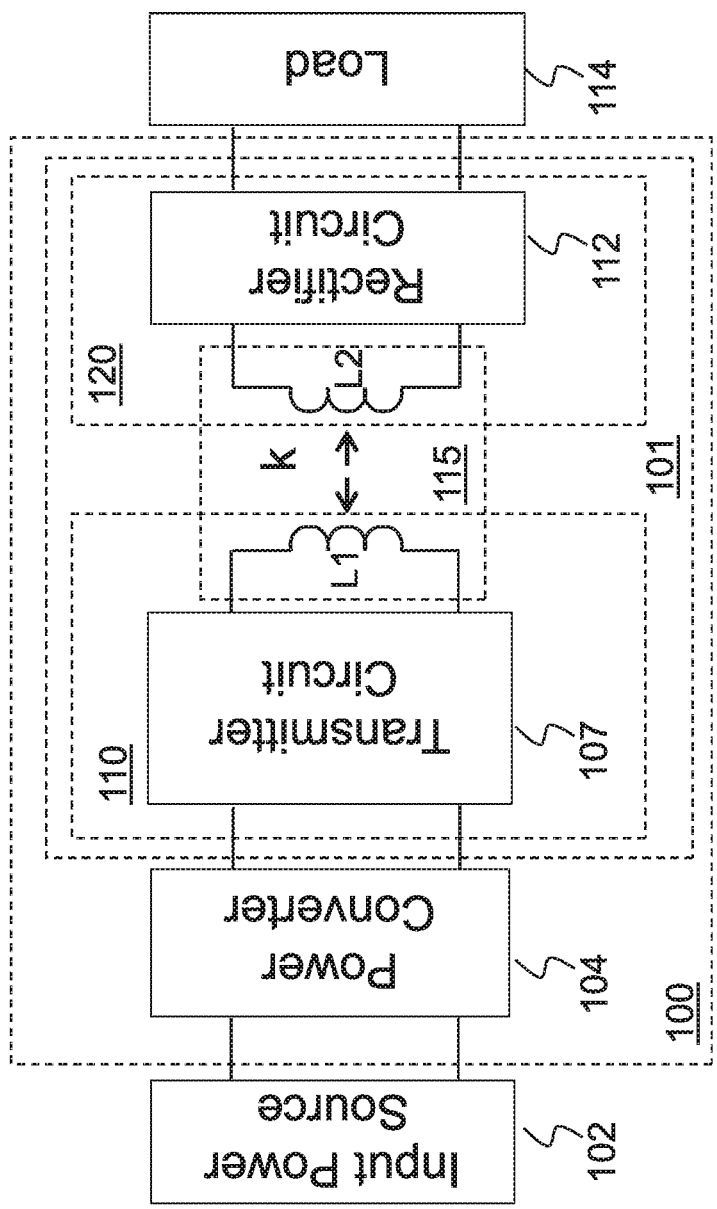
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2 and a rectifier 112 connected in cascade. The output of the rectifier 112 is coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, power may be transferred from the power transmitter 110 to the power receiver 120.

In some embodiments, the power transmitter 110 may be inside a charging pad. The transmitter coil is placed underneath the top surface of the charging pad. The power receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120.

The transmitter circuit 107 may comprise primary side switches of a full-bridge converter according to some embodiments. Alternatively, the transmitter circuit 107 may comprise the primary side switches of other converters such as a half-bridge converter, a push-pull converter and the like. The detailed configuration of the transmitter circuit 107 will be described below with respect to FIG. 2.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor.

The rectifier 112 converts an alternating polarity waveform received from the output of the receiver coil L2 to a single polarity waveform. In some embodiments, the rectifier 112 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The power converter 104 is coupled between the input power source 102 and the input of the wireless power transfer device 101. Depending design needs and different applications, the power converter 104 may comprise many different configurations. In some embodiments, the power converter 104 may be a non-isolated power converter such as a buck converter. In some embodiments, the power converter 104 may be implemented as a linear regulator. In some embodiments, the power converter 104 may be an isolated power converter such as a forward converter. The detailed configuration of the power converter 104 will be described below with respect to FIG. 2.

The implementation of the power converter 104 described above is merely an example, which should not unduly limit the scope of the claims. One of ordinary skill in the art would recognize many variations, alternatives, and modifications.

Figure 2:
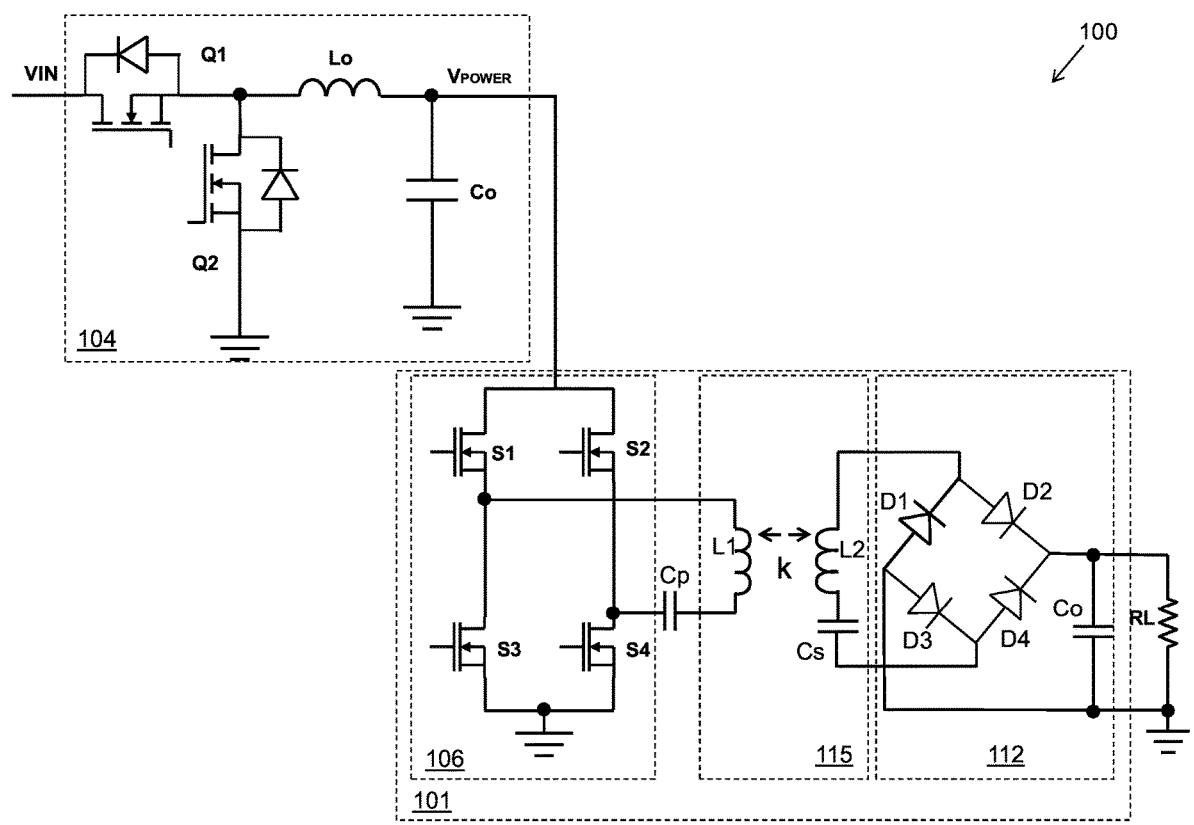
FIG. 2 illustrates a schematic diagram of the wireless power transfer system shown in FIG. 1 in accordance with various embodiments of the present disclosure.

FIG. 2 illustrates a schematic diagram of the wireless power transfer system shown in FIG. 1 in accordance with various embodiments of the present disclosure. The wireless power transfer system 100 comprises the power converter 104 and the wireless power transfer device 101 connected in cascade between the input power source VIN and the load RL.

The power converter 104 is a step-down power converter (also known as a buck converter). The power converter 104 includes a first switch Q1, a second switch Q2, an inductor Lo and an output capacitor Co. As shown in FIG. 2, the first switch Q1 and the second switch Q2 are connected in series between an input power source VIN and ground. The inductor Lo is connected between the common node of the first switch Q1 and the second switch Q2, and the output capacitor Co. Throughout the description, the first switch Q1 is alternatively referred to as a high-side switch of the power converter 104. The second switch Q2 is alternatively referred to as a low-side switch of the power converter 104.

In some embodiments, both the first switch Q1 is implemented and the second switch Q2 are implemented as an n-type transistors as shown in FIG. 2. The gate of the first switch Q1 and the gate of the second switch Q2 are configured to receive gate drive signals generated by a controller (not shown).

It should be noted that the power converter 104 shown in FIG. 2 is merely an example, which should not unduly limit the scope of the claims. One of ordinary skill in the art would recognize many variations, alternatives, and modifications. For example, the first switch Q1 may be implemented as a p-type transistor.

The wireless power transfer device 101 comprises a full-bridge 106, a resonant capacitor Cp, a loosely coupled transformer 115 and a rectifier 112 connected in cascade between an output of the power converter 104 and the load RL. The loosely coupled transformer 115 is formed by the transmitter coil L1 and the receiver coil L2.

The full-bridge 106 includes four switching elements, namely S1, S2, S3 and S4. As shown in FIG. 2, the switching elements S1 and S3 are connected in series between the output terminal of the power converter 104 and ground. Likewise, the switching elements S2 and S4 are connected in series between the output terminal of the power converter 104 and ground. The common node of the switching elements S1 and S3 is coupled to a first input terminal of the transmitter coil L1. The common node of the switching elements S2 and S4 is coupled to a second input terminal of the transmitter coil L1 through the resonant capacitor Cp.

According to some embodiments, the switching elements S1, S2, S3 and S4 are implemented as MOSFET or MOSFETs connected in parallel, any combinations thereof and/or the like. According to alternative embodiments, the switching elements (e.g., switch S1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-bridge converter (e.g., full-bridge converter 106 shown in FIG. 2), the implementation of the transmitter circuit 107 shown in FIG. 1 may have many variations, alternatives, and modifications. For example, half-bridge converters, push-pull converters, class E based power converters (e.g., a class E amplifier) may be alternatively employed. Furthermore, an inductor-inductor-capacitor (LLC) resonant converter may be formed when the transmitter coil L1 is tightly coupled with the receiver coil L2 in some applications.

In sum, the full-bridge 106 illustrated herein is limited solely for the purpose of clearly illustrating the inventive aspects of the various embodiments. The present invention is not limited to any particular power topology.

It should further be noted that while FIG. 2 illustrates four switches S1-S4, various embodiments of the present disclosure may include other variations, modifications and alternatives. For example, a separate capacitor may be connected in parallel with each switch of the full-bridge 106. Such a separate capacitor helps to better control the timing of the resonant process of the full-bridge 106.

The outputs of the receiver coil L2 are coupled to the load RL through a resonant capacitor Cs and the rectifier 112, which is formed by diodes D1, D2, D3 and D4. As shown in FIG. 2, diodes D1, D2, D3 and D4 form a full-wave diode rectifier coupled between the receiver coil L2 and the load RL. The capacitor Co is employed to attenuate noise and provide a steady output voltage.

It should be noted the rectifier structure shown in FIG. 2 is merely an example. One person skilled in the art will recognize many alternatives, variations and modification. For example, the diodes D1, D2, D3 and D4 may be replaced by four switches.

The wireless power transfer system 100 comprises the power converter 104 and the wireless power transfer device 101 connected in cascade. The power converter 104 is employed to regulate the voltage applied to the wireless power transfer device 101 when the wireless power transfer system 100 operates in light load conditions. More particularly, the power converter 104 is configured to regulate the voltage applied to the wireless power transfer device 101 when the load current of the wireless power transfer system 100 is less than a predetermined threshold. After the load current of the wireless power transfer system 100 is greater than the predetermined threshold, the power converter 104 is configured to operate in an always-on mode. During the always-on mode, the high-side switch Q1 is always on and the low-side switch Q2 is always off. Throughout the description, the always-on mode may be alternatively referred to as a bypass mode. In some embodiments, the predetermined threshold is in a range from about 5% of the full load to about 10% of the full load of the wireless power transfer system 100.

During the light load operation, in some embodiments, the full-bridge 106 is configured to operate in a minimum duty cycle control mode when the load current of the wireless power transfer system 100 is less than the predetermined threshold. In alternative embodiments, the full-bridge 106 is configured to operate in a minimum phase-shifted control mode when the load current of the wireless power transfer system is less than the predetermined threshold.

After the load current of the wireless power transfer system 100 is greater than the predetermined threshold, the full-bridge 106 is configured to operate in a duty cycle control mode. Alternatively, the full-bridge 106 is configured to operate in a phase-shifted control mode. The detailed operating principles of the power converter 104 and the full-bridge 106 will be described below with respect to FIGS. 3-14.

One advantageous feature of the power converter 104 shown in FIG. 2 is that the power converter 104 is capable of reducing voltage stresses on the full-bridge 106 through adjusting the output voltage of the power converter 104 during light load operation conditions. As a result, it is not necessary to have a dedicated EMI filter to satisfy the EMC regulations. Furthermore, after the wireless power transfer system 100 enters into a heavy load operating mode, the high side switch Q1 of the power converter 104 is always on. Such an always-on mode helps to reduce conduction losses of the wireless power transfer system 100 so as to achieve high efficiency.

Figure 3:
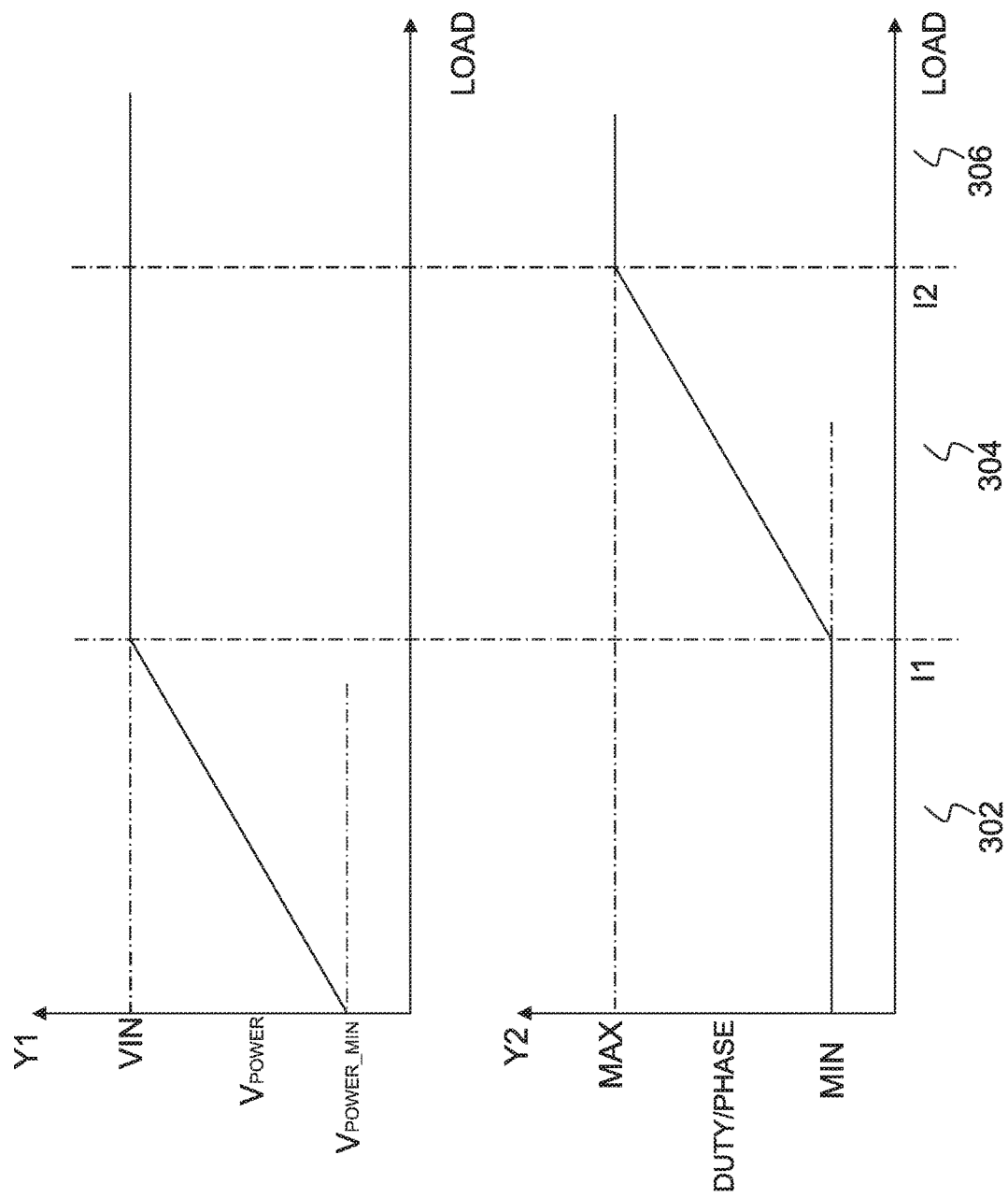
FIG. 3 is an operating mode control chart illustrating the operating principle of the wireless power transfer system shown in FIG. 1 in accordance with various embodiments of the present disclosure.

FIG. 3 is an operating mode control chart illustrating the operating principle of the wireless power transfer system shown in FIG. 1 in accordance with various embodiments of the present disclosure. The horizontal axis of FIG. 3 represents the load current of the wireless power transfer system. There may be two vertical axes. The first vertical axis Y1 represents the output voltage of the power converter 104. The second vertical axis Y2 represents the duty/phase of the full-bridge 106 of the wireless power transfer system 100.

As shown in FIG. 3, the operating mode control chart includes three portions, namely a first portion 302, a second portion 304 and a third portion 306. In the first portion 302, the load current of the wireless power transfer system 100 is less than a first predetermined threshold. The power converter 104 is configured to regulate the voltage applied to the full-bridge 106 in a linear manner as shown in FIG. 3. At the same time, the full-bridge 106 is configured to operate in a minimum duty cycle control mode or a minimum phase-shifted control mode.

In the second portion 304, the load current of the wireless power transfer system 100 is less than a second predetermined threshold and greater than the first predetermined threshold. The power converter 104 is configured to operate in the always-on mode. The full-bridge 106 is configured to operate in a duty cycle control mode or a phase-shifted control mode.

In the third portion 306, the load current of the wireless power transfer system 100 is greater than the second predetermined threshold. The power converter 104 is configured to operate in the always-on mode. The full-bridge 106 is configured to operate in a maximum duty cycle control mode or a maximum phase-shifted control mode (e.g., the duty/phase at I2 shown in FIG. 3).

It should be noted that there are at least three operating modes shown in FIG. 3. The wireless power transfer system 100 is capable of having a smooth transition between different modes depending on the load of the wireless power transfer system. For example, the wireless power transfer system 100 starts with a light load condition (e.g., the first portion 302 shown in FIG. 3). During the light load condition, the power converter 104 regulates the voltage applied to the full-bridge 106. As the load of the wireless power transfer system 100 increases, the output of the power converter 104 reaches its maximum voltage (e.g., the voltage at I1 shown in FIG. 3). The power converter 104 stops switching and enters into the always-on mode. The full-bridge 106 of the wireless power transfer system 100 automatically enters into a duty cycle control mode or a phase-shifted control mode (e.g., the second portion 304 shown in FIG. 3). Furthermore, as the load of the wireless power transfer system 100 decreases and the minimum duty or the minimum phase shift is reached, the power converter 104 automatically switches from the always-on mode to the voltage regulation mode as shown in FIG. 3. The minimum duty may be alternatively referred to as a clamped duty. Likewise, the minimum phase may be alternatively referred to as a clamped phase.

As shown in FIG. 3, depending on different load currents, the full-bridge 106 may operate in a minimum duty/phase-shifted control mode or a duty/phase-shifted control mode. The gate drive signals of the full-bridge 106 operating in the minimum duty control mode will be illustrated in FIGS. 4-5. The gate drive signals of the full-bridge 106 operating in the minimum phase-shifted control mode will be illustrated in FIG. 6. The gate drive signals of the full-bridge 106 operating in the duty control mode will be illustrated in FIGS. 7-8. The gate drive signals of the full-bridge 106 operating in the phase-shifted control mode will be illustrated in FIG. 9.

Figure 4:
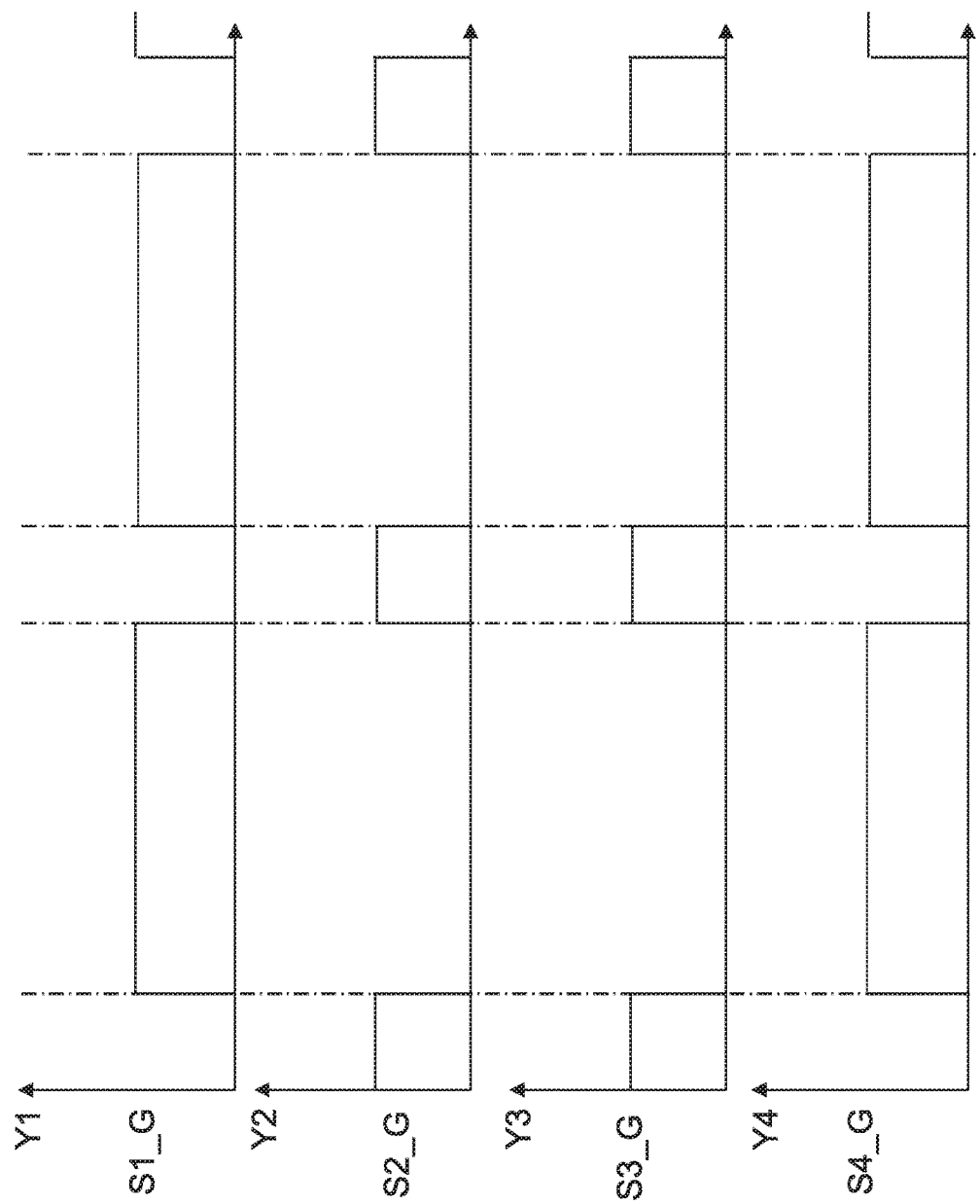
FIG. 4 illustrates gate drive signals associated with a first implementation of the minimum duty cycle control mode in accordance with various embodiments of the present disclosure.

FIG. 4 illustrates gate drive signals associated with a first implementation of the minimum duty cycle control mode in accordance with various embodiments of the present disclosure. The horizontal axis of FIG. 4 represents intervals of time. There may be four vertical axes. The first vertical axis Y1 represents the gate drive signal of the switching element S1. The second vertical axis Y2 represents the gate drive signal of the switching element S2. The third vertical axis Y3 represents the gate drive signal of the switching element S3. The fourth vertical axis Y4 represents the gate drive signal of the switching element S4.

Referring back to FIG. 2, the full-bridge comprises four switching elements S1-S4. When the load current of the wireless power transfer system 100 is less than a predetermined threshold, the power converter is configured to regulate the voltage applied to the input of the full-bridge 106. The full-bridge 106 is configured to operate in a minimum duty cycle control mode.

During the minimum duty cycle control mode, the gate drive signal of the switching element S3 is complementary to the gate drive signal of the switching element S4. The gate drive signal of the switching element S1 is inverted from the gate drive signal of the switching element S3. In some embodiments, the gate drive signal of the switching element S1 may be generated by coupling an inverter between the gate of the switching element S1 and the gate of the switching element S3 Likewise, the gate drive signal of the switching element S2 is inverted from the gate drive signal of the switching element S4. In some embodiments, the gate drive signal of the switching element S2 may be generated by coupling an inverter between the gate of the switching element S2 and the gate of the switching element S4.

In some embodiments, the duty cycle of the gate drive signal of the switching element S3 represents the minimum duty cycle of the full-bridge 106. The minimum duty cycle is about 30% in accordance with some embodiments. It should be noted the minimum duty cycle shown in FIG. 4 is merely an example. Depending on different applications and design needs, the minimum duty cycle may vary accordingly.

It should further be noted the gate drive signals shown in FIG. 4 is merely an example, which should not unduly limit the scope of the claims. One of ordinary skill in the art would recognize many variations, alternatives, and modifications. For example, there may be a dead time between two complementary gate drive signals described above.

Figure 5:
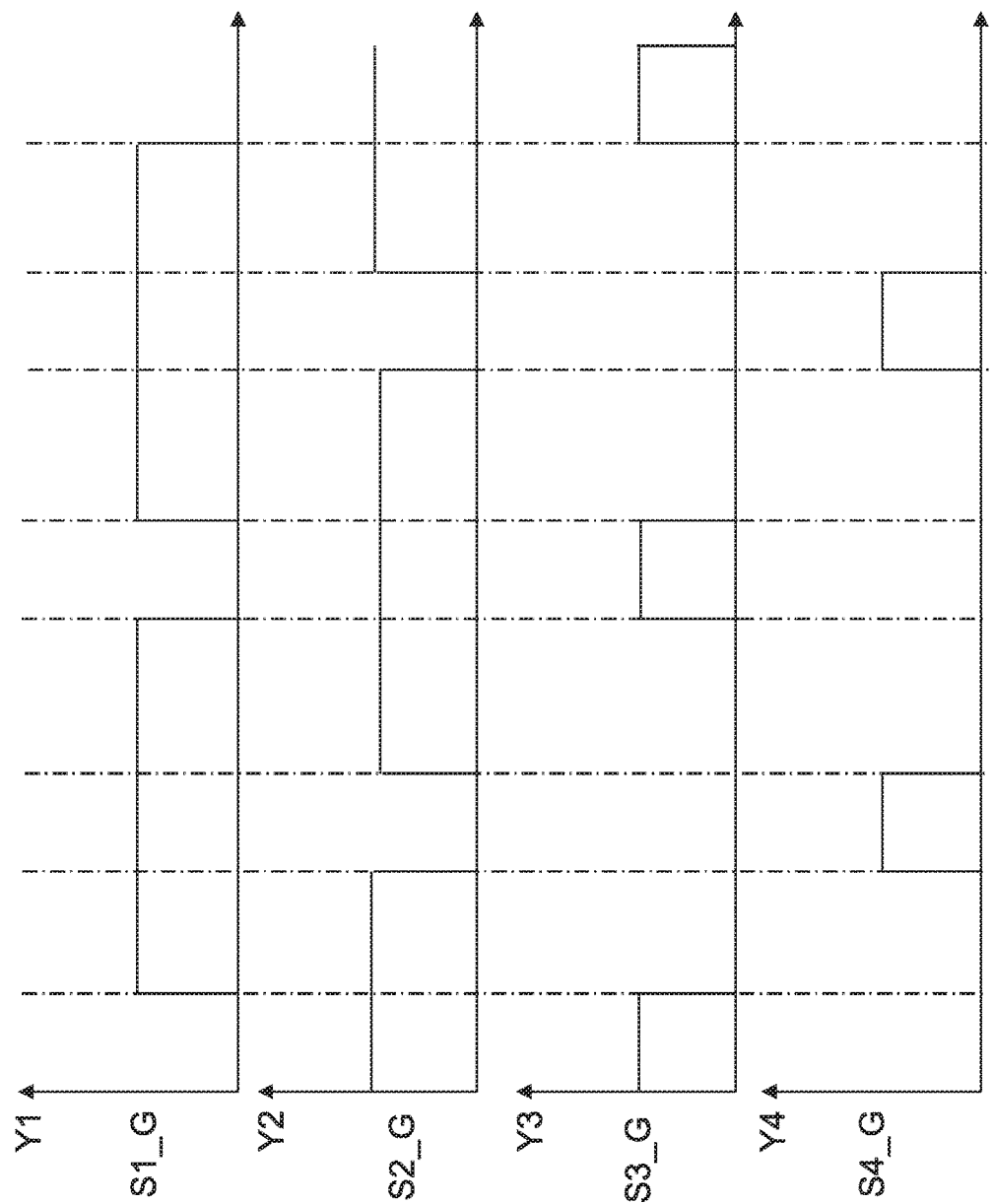
FIG. 5 illustrates gate drive signals associated with a second implementation of the minimum duty cycle control mode in accordance with various embodiments of the present disclosure.

FIG. 5 illustrates gate drive signals associated with a second implementation of the minimum duty cycle control mode in accordance with various embodiments of the present disclosure. The minimum duty cycle control mode shown in FIG. 5 is similar to that shown in FIG. 4 except that the gate drive signal of the switching element S3 is not complementary to the gate drive signal of the switching element S4. As shown in FIG. 5, there is a phase shift between the gate drive signal of the switching element S3 and the gate drive signal of the switching element S4.

In some embodiments, the gate drive signal of the switching element S1 is inverted from the gate drive signal of the switching element S3. The gate drive signal of the switching element S2 is inverted from the gate drive signal of the switching element S4. In some embodiments, the duty cycle of the gate drive signal of the switching element S3 represents the minimum duty cycle of the full-bridge. The minimum duty cycle is about 30% in accordance with some embodiments.

Figure 6:
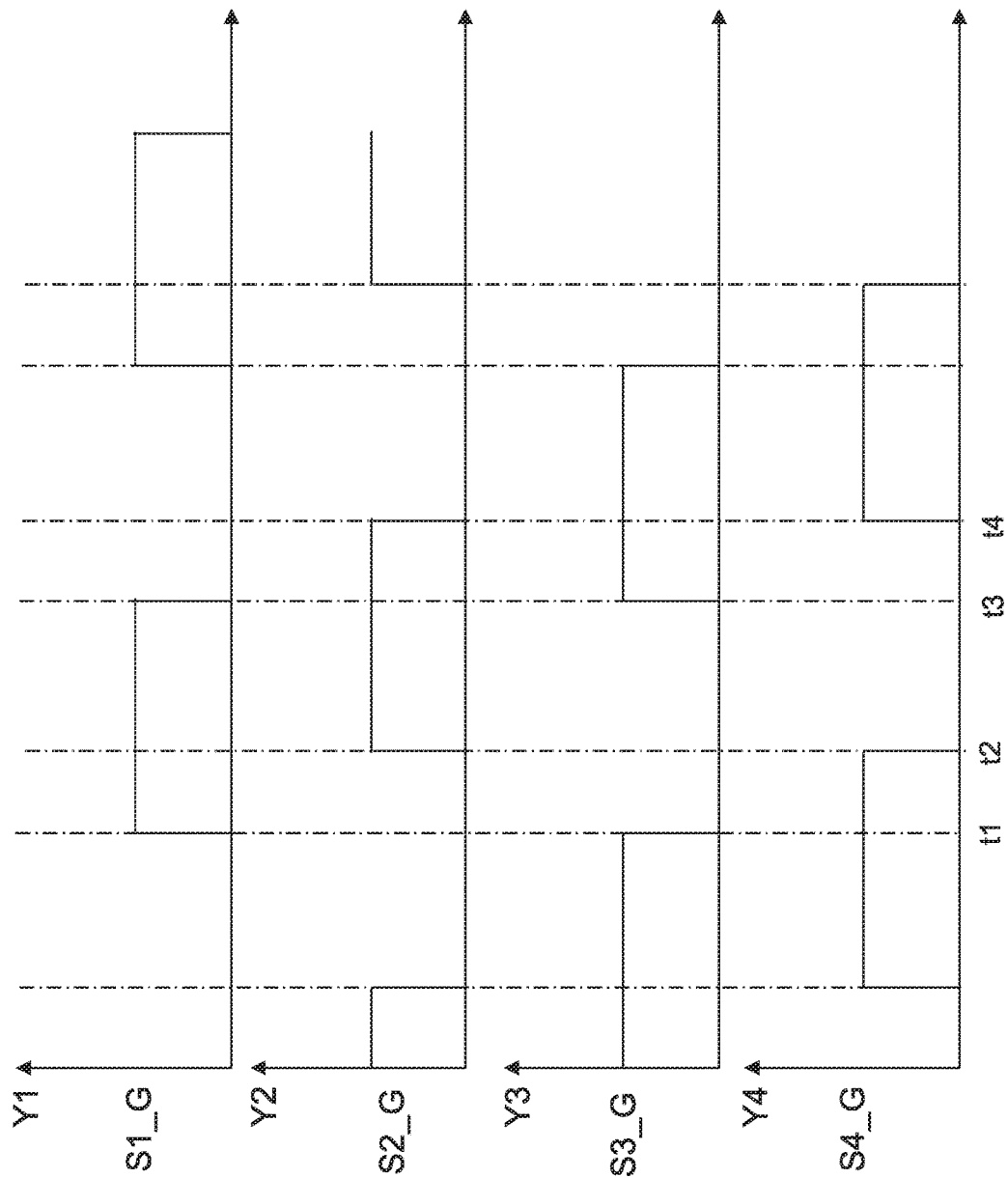
FIG. 6 illustrates gate drive signals associated with the minimum phase-shifted control mode in accordance with various embodiments of the present disclosure.

FIG. 6 illustrates gate drive signals associated with the minimum phase-shifted control mode in accordance with various embodiments of the present disclosure. In the minimum phase-shifted control mode, there is a phase shift between the gate drive signal of the switching element S3 and the gate drive signal of the switching element S4. The gate drive signal of the switching element S1 is inverted from the gate drive signal of the switching element S3. The gate drive signal of the switching element S2 is inverted from the gate drive signal of the switching element S4.

In some embodiments, the power of the wireless power transfer system 100 is delivered from the transmitter coil L1 to the receiver coil L2 during a first time period from the time instant t1 to the time instant t2, and a second time period from the time instant t3 to the time instant t4.

Figure 7:
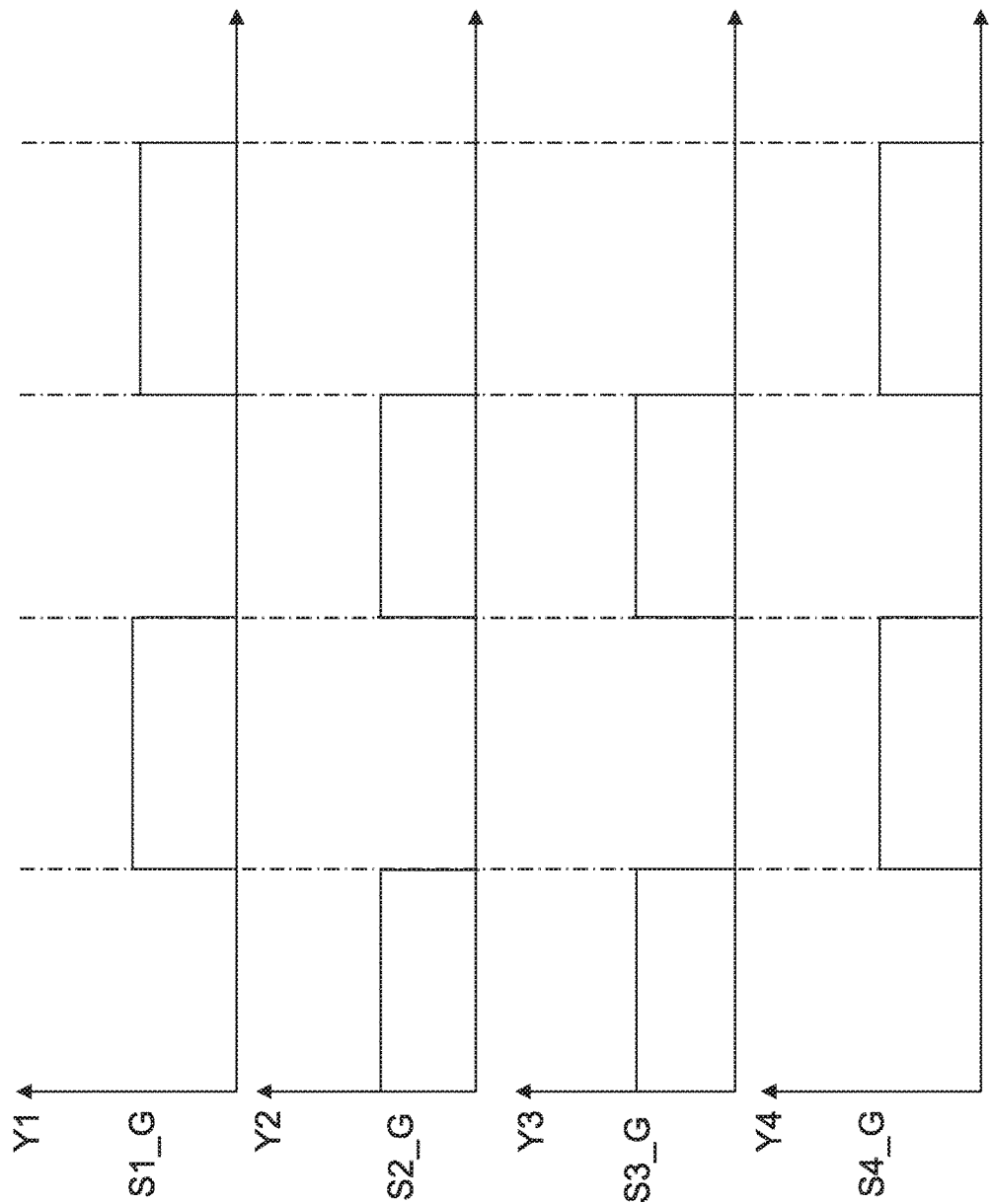
FIG. 7 illustrates gate drive signals associated with a first implementation of the duty cycle control mode in accordance with various embodiments of the present disclosure.

FIG. 7 illustrates gate drive signals associated with a first implementation of the duty cycle control mode in accordance with various embodiments of the present disclosure. The gate drive signals shown in FIG. 7 are similar to the gate drive signals shown in FIG. 4 except the duty cycle is adjustable so as to control the power delivered from the transmitter coil L1 to the receiver coil L2. In some embodiments, the duty cycle is in a range from about 30% to about 50%.

Figure 8:
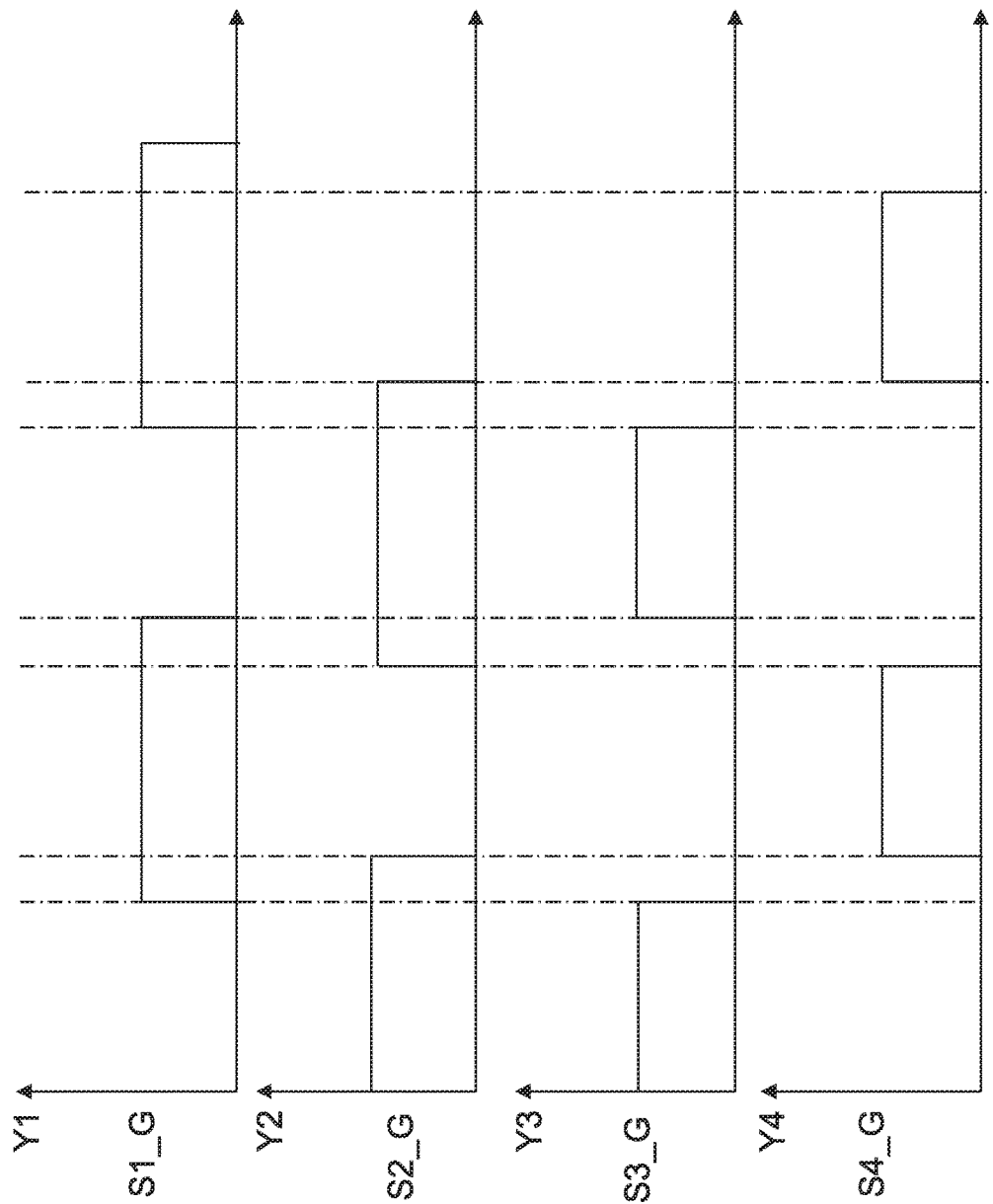
FIG. 8 illustrates gate drive signals associated with a second implementation of the duty cycle control mode in accordance with various embodiments of the present disclosure.

FIG. 8 illustrates gate drive signals associated with a second implementation of the duty cycle control mode in accordance with various embodiments of the present disclosure. The gate drive signals shown in FIG. 8 are similar to the gate drive signals shown in FIG. 5 except the duty cycle is adjustable so as to control the power delivered from the transmitter coil L1 to the receiver coil L2. In some embodiments, the duty cycle is in a range from about 30% to about 50%.

Figure 9:
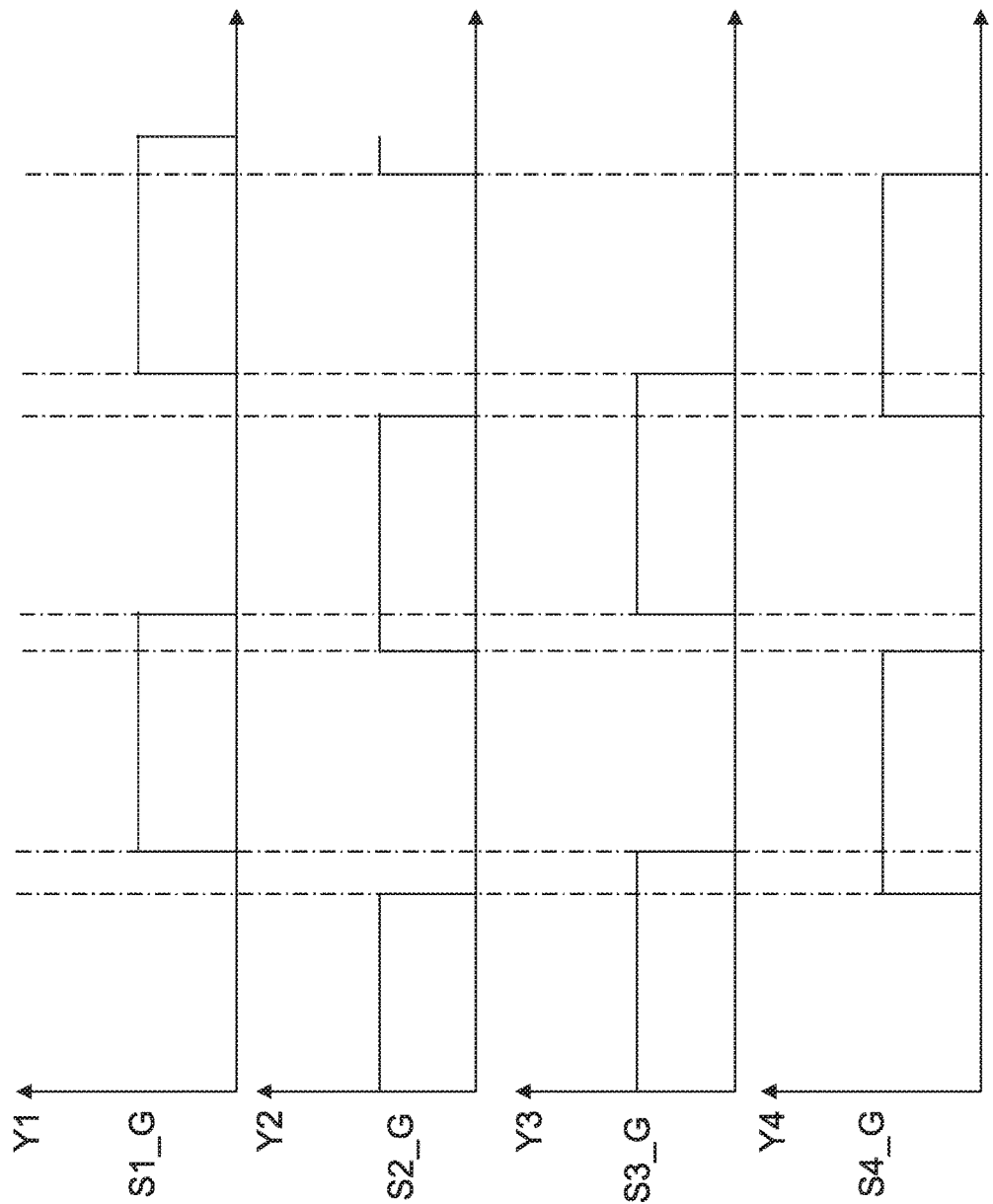
FIG. 9 illustrates gate drive signals associated with the phase-shifted control mode in accordance with various embodiments of the present disclosure.

FIG. 9 illustrates gate drive signals associated with the phase-shifted control mode in accordance with various embodiments of the present disclosure. The gate drive signals shown in FIG. 9 are similar to the gate drive signals shown in FIG. 6 except the phase shift between the gate drive signal of the switching element S3 and the gate drive signal of the switching element S4 is adjustable so as to control the power delivered from the transmitter coil L1 to the receiver coil L2.

Figure 10:
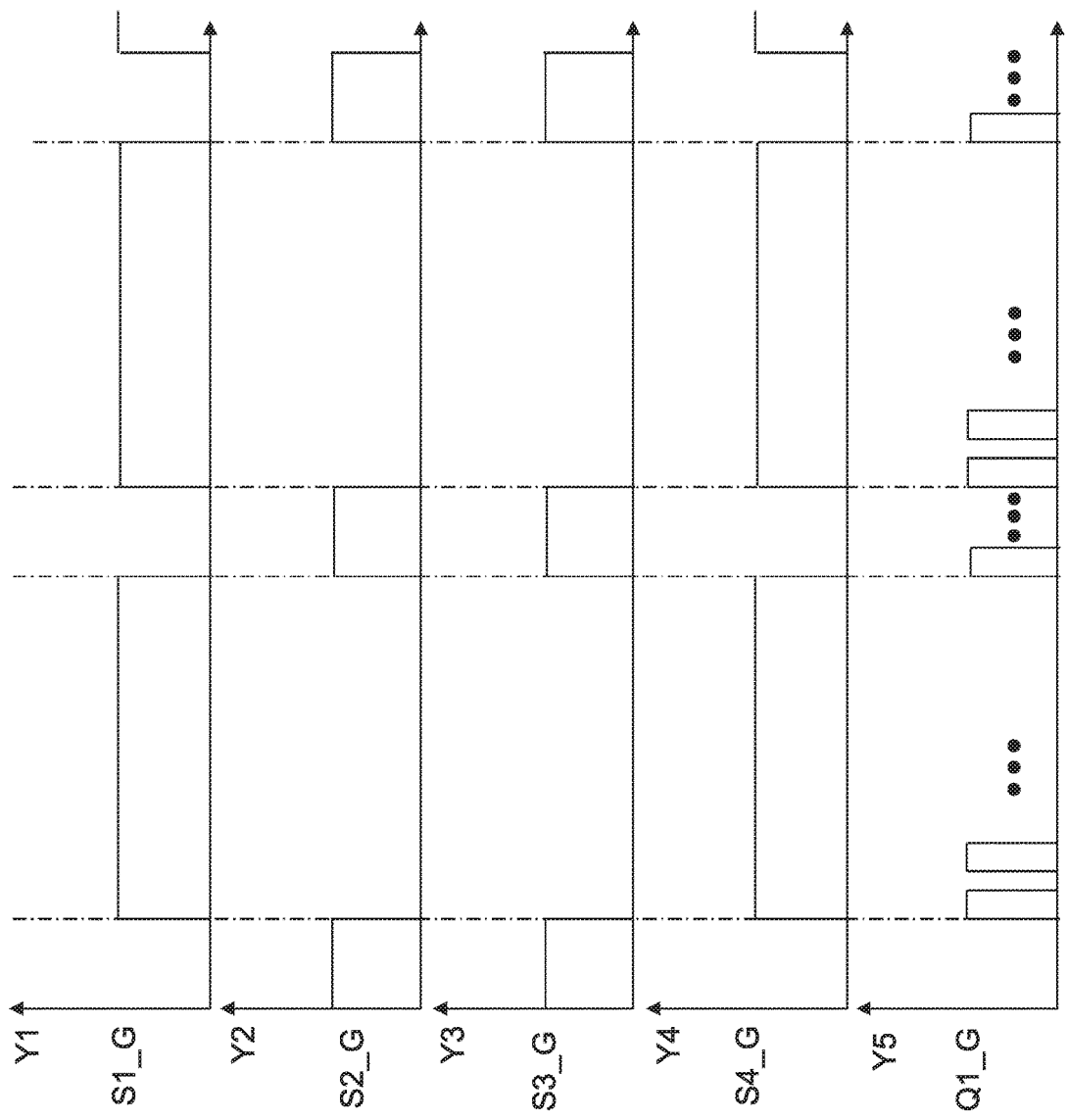
FIG. 10 illustrates gate drive signals having a leading edge alignment under the first implementation of the minimum duty cycle control mode in accordance with various embodiments of the present disclosure.

FIG. 10 illustrates gate drive signals having a leading edge alignment under the first implementation of the minimum duty cycle control mode in accordance with various embodiments of the present disclosure. The horizontal axis of FIG. 10 represents intervals of time. There may be five vertical axes. The first vertical axis Y1 represents the gate drive signal of the switching element S1. The second vertical axis Y2 represents the gate drive signal of the switching element S2. The third vertical axis Y3 represents the gate drive signal of the switching element S3. The fourth vertical axis Y4 represents the gate drive signal of the switching element S4. The fifth vertical axis Y5 represents the gate drive signal of the high-side switch Q1 of the power converter 104.

In order to improve the EMI performance of the wireless power transfer system 100, the leading edge of the gate drive signal of the high-side switch Q1 is aligned with the leading edge of the gate drive signal of the switching element S3 as shown in FIG. 10. Furthermore, the leading edge of the high-side switch Q1 is also aligned with the leading edge of the gate drive signal of the switching element S4. Such an alignment between the gate drive signal of the power converter 104 and the gate drive signals of the full-bridge 106 helps to reduce various EMI issues such as the beat-frequency issue.

In some embodiments, the switching frequency of the power converter 104 is N times greater than that of the full-bridge 106. N is an integer. In some embodiments, the switching frequency of the full-bridge 106 is about 120 KHz. The switching frequency of the power converter 104 is about 1.2 MHz.

Figure 11:
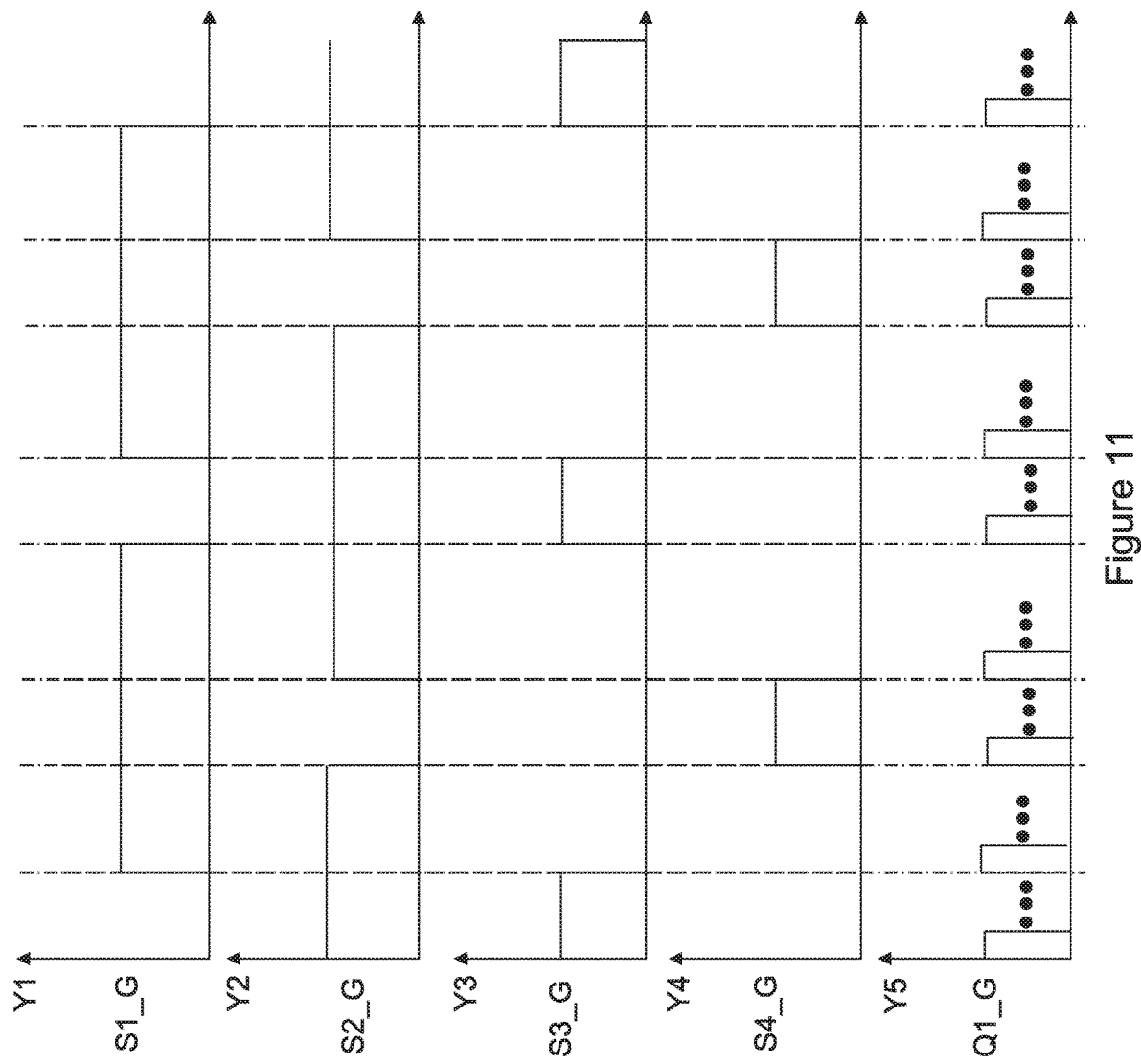
FIG. 11 illustrates gate drive signals having a first leading edge alignment under the second implementation of the minimum duty cycle control mode in accordance with various embodiments of the present disclosure.

FIG. 11 illustrates gate drive signals having a first leading edge alignment under the second implementation of the minimum duty cycle control mode in accordance with various embodiments of the present disclosure. The gate drive signal alignment shown in FIG. 11 is similar to that shown in FIG. 10 except that the leading edges of the gate drive signal of the high-side switch Q1 are aligned with the leading edges of the gate drive signals of the switching elements S1-S4, respectively as shown in FIG. 11.

Figure 12:
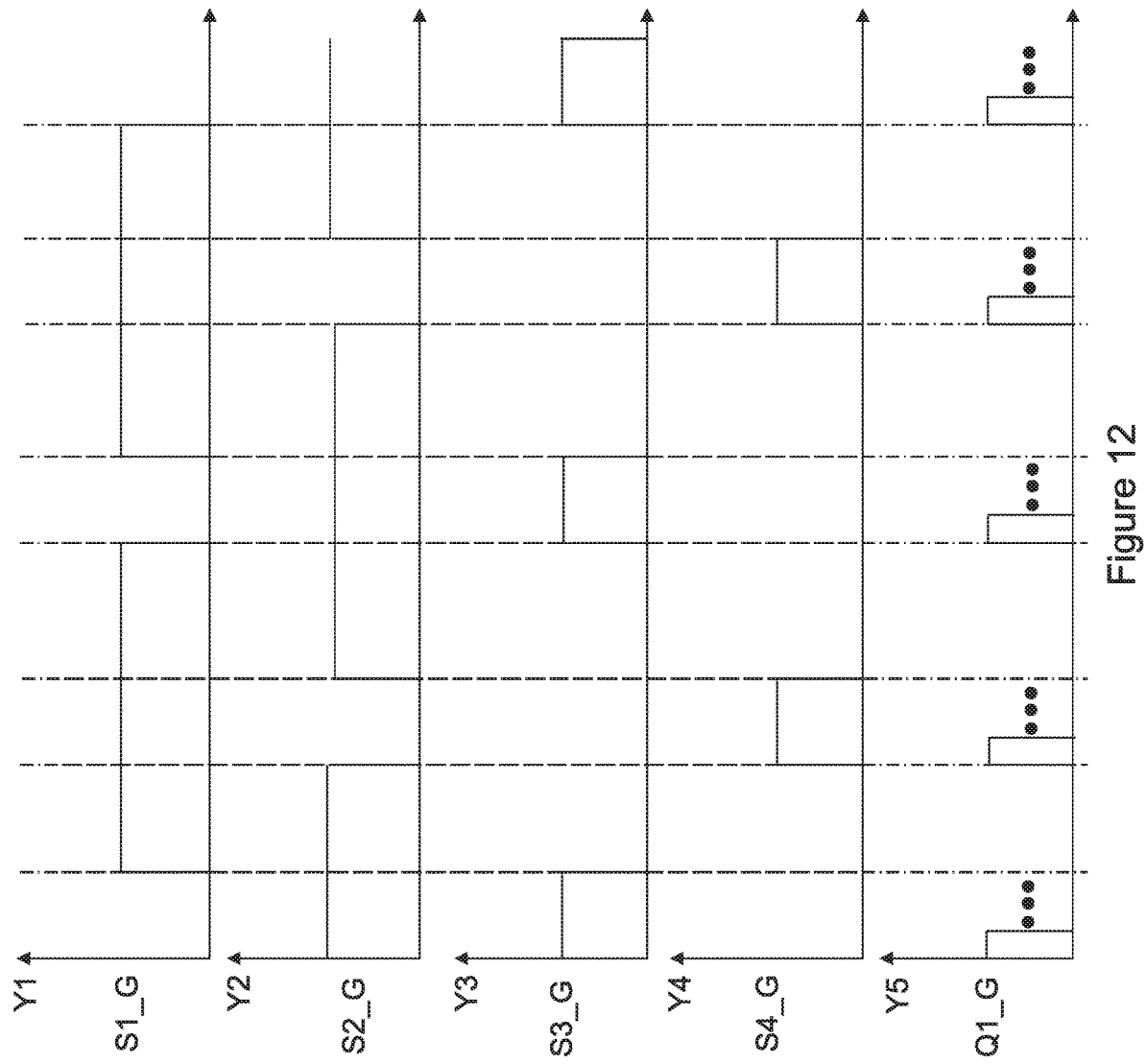
FIG. 12 illustrates gate drive signals having a second leading edge alignment under the second implementation of the minimum duty cycle control mode in accordance with various embodiments of the present disclosure.

FIG. 12 illustrates gate drive signals having a second leading edge alignment under the second implementation of the minimum duty cycle control mode in accordance with various embodiments of the present disclosure. The gate drive signal alignment shown in FIG. 12 is similar to that shown in FIG. 11 except that the leading edges of the gate drive signal of the high-side switch Q1 are aligned with the leading edges of the gate drive signals of the switching elements S3 and S4, respectively as shown in FIG. 12.

Figure 13:
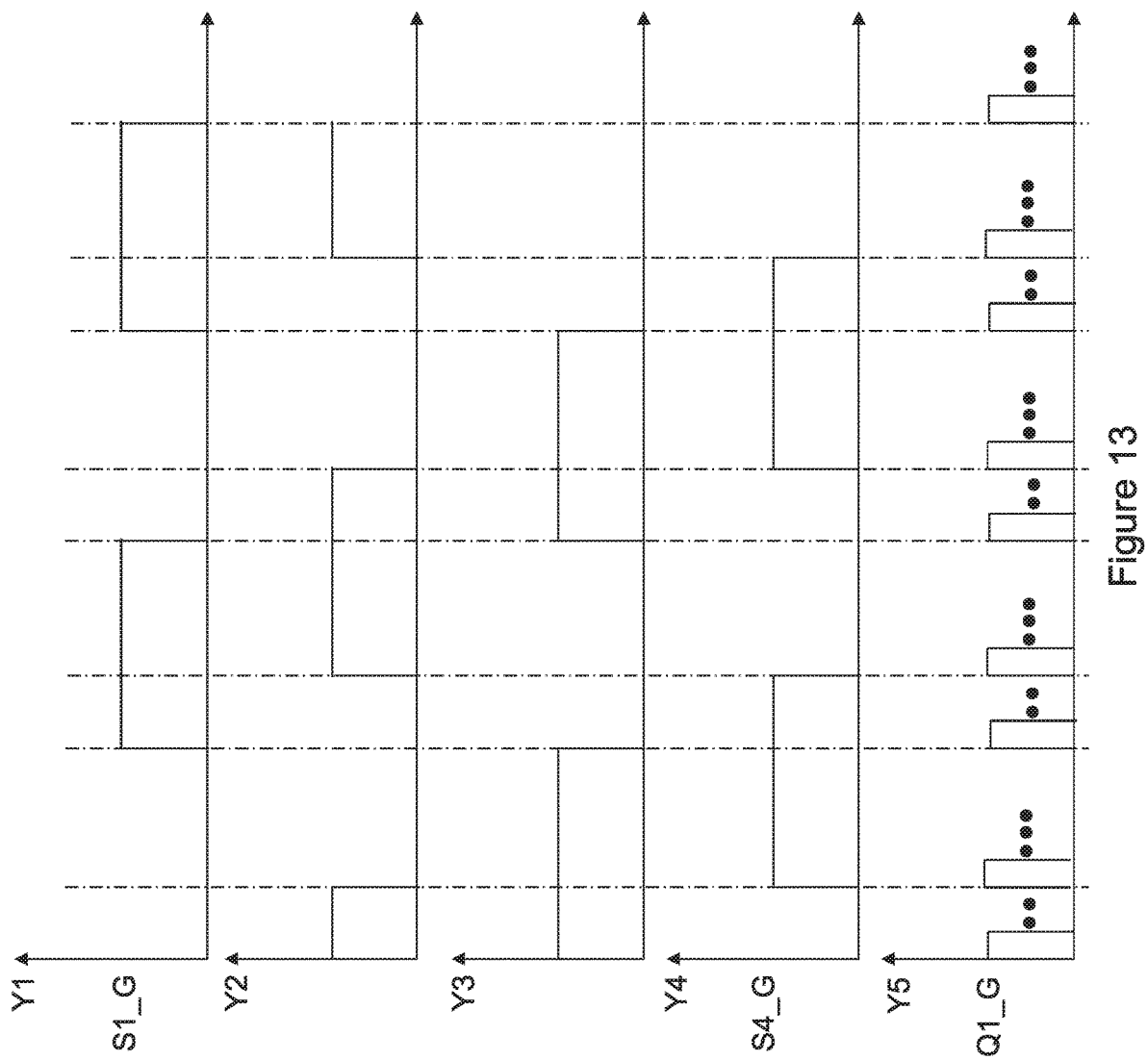
FIG. 13 illustrates gate drive signals having a first leading edge alignment under the minimum phase-shifted control mode in accordance with various embodiments of the present disclosure.

FIG. 13 illustrates gate drive signals having a first leading edge alignment under the minimum phase-shifted control mode in accordance with various embodiments of the present disclosure. The gate drive signal alignment shown in FIG. 13 is similar to that shown in FIG. 10 except that the leading edges of the gate drive signal of the high-side switch Q1 are aligned with the leading edges of the gate drive signals of the switching elements S1-S4, respectively as shown in FIG. 13.

Figure 14:
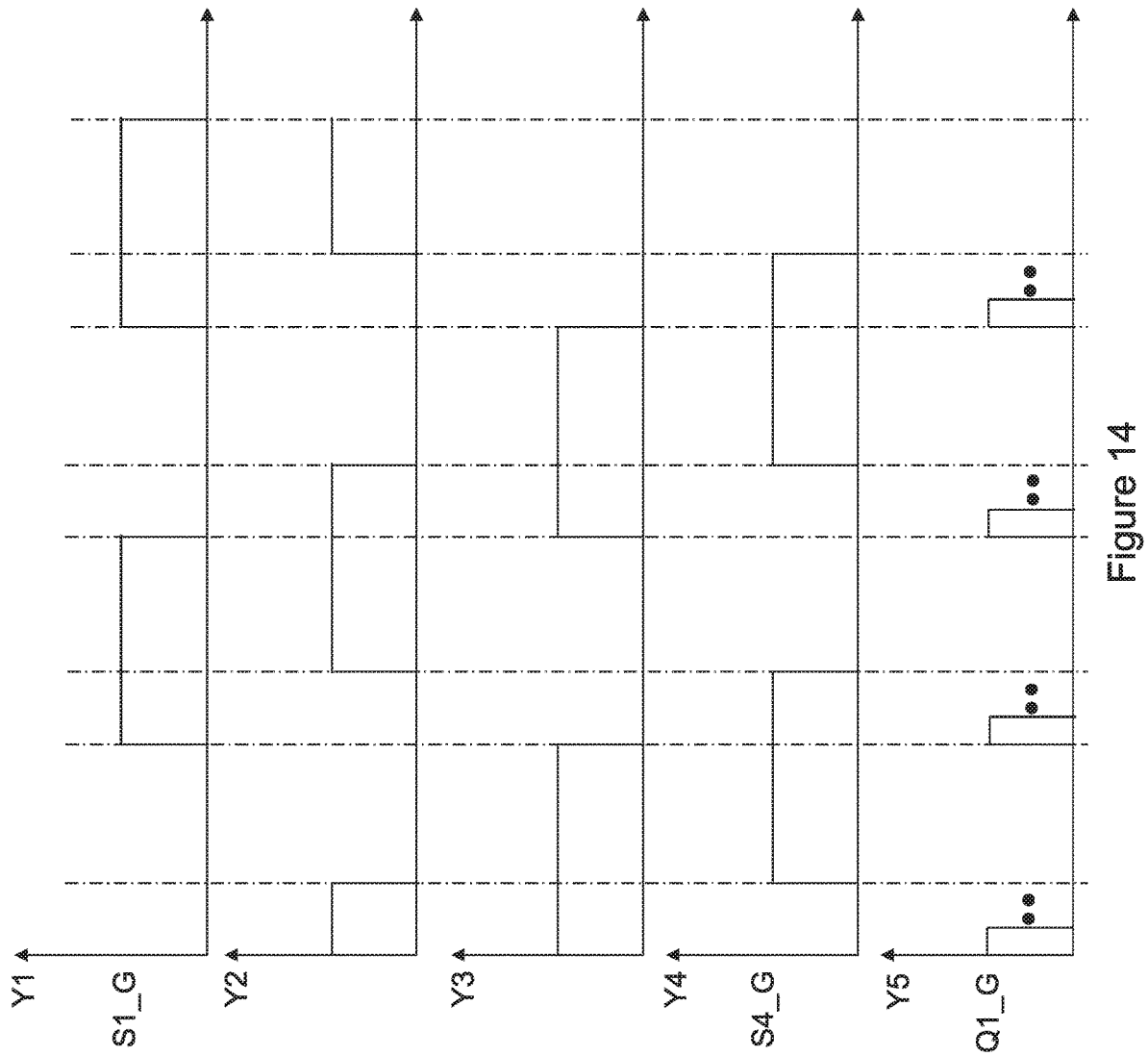
FIG. 14 illustrates gate drive signals having a second leading edge alignment under the minimum phase-shifted control mode in accordance with various embodiments of the present disclosure.

FIG. 14 illustrates gate drive signals having a second leading edge alignment under the minimum phase-shifted control mode in accordance with various embodiments of the present disclosure. The gate drive signal alignment shown in FIG. 14 is similar to that shown in FIG. 13 except that the leading edges of the gate drive signal of the high-side switch Q1 are aligned with the leading edges of the gate drive signals of the switching elements S1 and S3, respectively as shown in FIG. 14.

Figure 15:
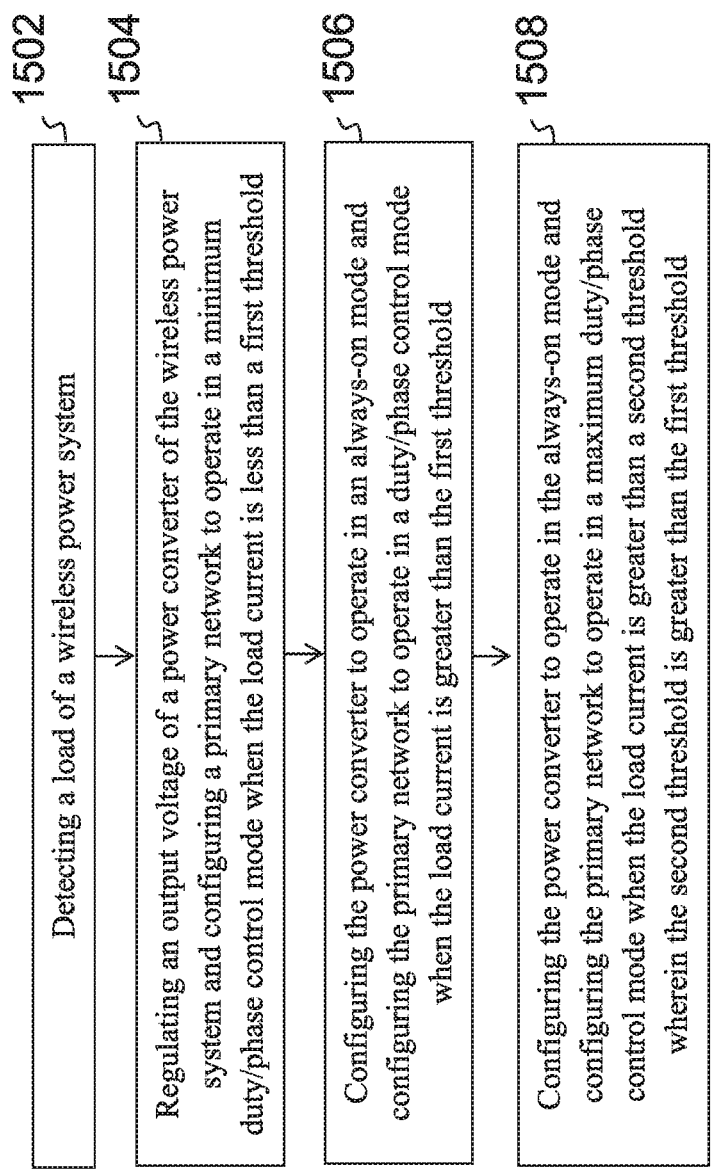
FIG. 15 illustrates a flow chart of controlling the switches shown in FIG. 2 in accordance with various embodiments of the present disclosure.

FIG. 15 illustrates a flow chart of controlling the switches shown in FIG. 2 in accordance with various embodiments of the present disclosure. This flowchart shown in FIG. 15 is merely an example, which should not unduly limit the scope of the claims. One of ordinary skill in the art would recognize many variations, alternatives, and modifications. For example, various steps illustrated in FIG. 15 may be added, removed, replaced, rearranged and repeated.

Referring back to FIG. 2, the wireless power transfer system 100 comprises a power converter 104 and a wireless power transfer device 101 connected in cascade between an input power source VIN and a load RL. The power converter 104 is a step-down power converter. The wireless power transfer device 101 comprises a full-bridge 106 connected between the output of the power converter 104 and a transmitter coil L1.

Depending on different load conditions, the wireless power transfer system 100 may operate in different operating modes to improve the performance of the wireless power transfer system. More particularly, in a light load condition, the power converter 104 is configured to regulate the voltage applied to the full-bridge 106. At the same time, the full-bridge 106 is configured to operate in a minimum duty cycle control mode or a minimum phase-shifted control mode. After the load of the wireless power transfer system 100 reaches a predetermined threshold, the power converter 104 enters into an always-on mode, and a duty cycle control mode or a phase-shifted control mode may be applied to the full-bridge 106 to control the power delivered to the load of the wireless power transfer system 100.

At step 1502, the load of the wireless power transfer system 100 is detected by a suitable sensing apparatus. The detected load is processed by a controller. In particular, the detected load current is compared with predetermined current thresholds. In some embodiments, the controller may be a digital controller.

At step 1504, the power converter 104 is configured to regulate the voltage applied to the full-bridge 106 of the wireless power transfer device when the load current is less than a first current threshold. In some embodiments, the full-bridge 106 is configured to operate in a minimum phase-shifted control mode when the load current is less than the first current threshold. In alternative embodiments, the full-bridge 106 is configured to operate in a minimum duty cycle control mode.

It should be noted that the thresholds above are merely an example, which should not unduly limit the scope of the claims. One of ordinary skill in the art would recognize many variations, alternatives, and modifications. For example, the first current threshold may vary depending on different applications and design needs.

At step 1506, the power converter 104 is configured to operate in an always-on mode when the load current is greater than the first current threshold. In some embodiments, the full-bridge 106 is configured to operate in a phase-shifted control mode when the load current is greater than the first current threshold. In alternative embodiments, the full-bridge 106 is configured to operate in a duty cycle control mode.

At step 1508, the power converter 104 is configured to operate in the always-on mode when the load current is greater than a second current threshold. In some embodiments, the full-bridge 106 is configured to operate in a maximum phase-shifted control mode when the load current is greater than the second current threshold. In alternative embodiments, the full-bridge 106 is configured to operate in a maximum duty cycle control mode. The second current threshold is greater than the first current threshold.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a power converter connected between an input power source and a wireless power transfer system, wherein:
   the power converter is configured to regulate a voltage applied to the wireless power transfer system when a load current of the wireless power transfer system is less than a first threshold; and
   the power converter is configured to operate in a bypass mode when the load current of the wireless power transfer system is greater than the first threshold, and wherein during the bypass mode, the voltage applied to the wireless power transfer system is substantially equal to an output voltage of the input power source.

2. The apparatus of claim 1, wherein:
the power converter is a step-down converter.

3. The apparatus of claim 1, wherein the wireless power transfer system comprises:
a full-bridge connected between an output of the power converter and ground;
a transmitter coil coupled to the full-bridge;
a receiver coil magnetically coupled to the transmitter coil; and
a rectifier connected to the receiver coil.

4. The apparatus of claim 3, wherein:
the full-bridge is configured to operate in a minimum duty cycle control mode when the load current of the wireless power transfer system is less than the first threshold; and
the full-bridge is configured to operate in a duty cycle control mode when the load current of the wireless power transfer system is greater than the first threshold.

5. The apparatus of claim 3, wherein:
the full-bridge is configured to operate in a minimum phase-shifted control mode when the load current of the wireless power transfer system is less than the first threshold; and
the full-bridge is configured to operate in a phase-shifted control mode when the load current of the wireless power transfer system is greater than the first threshold.

6. The apparatus of claim 3, wherein the rectifier comprises:
a full-wave rectifier and a capacitor connected in cascade, and wherein the full-wave rectifier comprises four diodes.

7. The apparatus of claim 3, further comprising:
a resonant capacitor connected between the full-bridge and the transmitter coil.

8. The apparatus of claim 3, wherein:
the full-bridge is configured to operate in a maximum duty cycle control mode when the load current of the wireless power transfer system is greater than a second threshold.

9. The apparatus of claim 8, wherein:
the second threshold is greater than the first threshold.

10. The apparatus of claim 1, wherein:
the power converter is configured to regulate the voltage applied to the wireless power transfer system such that the voltage applied to the wireless power transfer system rises in a linear manner.

11. A method comprising:
detecting a load current of a wireless power transfer system comprising a power converter and a wireless power transfer device connected in cascade between an input power source and a load;
configuring the power converter to regulate a voltage applied to the wireless power transfer device when the load current is less than a first current threshold; and
configuring the power converter to operate in a bypass mode when the load current is greater than the first current threshold, and wherein during the bypass mode, the voltage applied to the wireless power transfer device is substantially equal to an output voltage of the input power source.

12. The method of claim 11, wherein:
the power converter comprises:
a high-side switch and a low-side switch connected in series between the input power source and ground; and
an inductor connected to a common node of the high-side switch and the low-side switch; and the wireless power transfer device comprises:
a full-bridge connected between an output of the power converter and ground;
a transmitter coil coupled to the full-bridge;
a resonant capacitor connected between the full-bridge and the transmitter coil;
a receiver coil magnetically coupled to the transmitter coil; and
a rectifier connected to the receiver coil.

13. The method of claim 12, further comprising:
configuring the full-bridge to operate in a minimum phase-shifted control mode when the load current is less than the first current threshold; and
configuring the full-bridge to operate in a phase-shifted control mode when the load current is greater than the first current threshold.

14. The method of claim 12, further comprising:
configuring the full-bridge to operate in a minimum duty cycle mode when the load current is less than the first current threshold; and
configuring the full-bridge to operate in a duty cycle control mode when the load current is greater than the first current threshold.

15. The method of claim 14, wherein:
the power converter automatically switches from a voltage regulation mode to the bypass mode after an output voltage of the power converter reaches a maximum output voltage of the power converter; and
the power converter automatically switches from the bypass mode to the voltage regulation mode after the full-bridge reaches a clamped duty cycle of the full-bridge.

16. The method of claim 14, wherein:
a switching frequency of the power converter is N times greater than a switching frequency of the full-bridge, and wherein N is an integer.

17. A system comprising:
a converter comprising:
a high-side switch and a low-side switch connected in series between an input power source and ground;
an inductor connected to a common node of the high-side switch and the low-side switch; and
an output capacitor connected to the inductor; and
a wireless power transfer device comprising:
a full-bridge connected between an output of the converter and ground;
a transmitter coil coupled to the full-bridge;
a resonant capacitor connected between the full-bridge and the transmitter coil;
a receiver coil magnetically coupled to the transmitter coil; and
a rectifier connected to the receiver coil, wherein the converter is configured to operate in two different operation modes in response to different load currents of the wireless power transfer device.

18. The system of claim 17, wherein:
the converter is configured to regulate a voltage applied to the full-bridge when a load current of the wireless power transfer device is less than a first threshold; and
the converter is configured to operate in a bypass mode when the load current of the wireless power transfer device is greater than the first threshold, and wherein during the bypass mode, the voltage applied to the full-bridge is substantially equal to an output voltage of the input power source.

19. The system of claim 18, wherein:

the full-bridge is configured to operate in a minimum duty cycle mode when the load current of the wireless power transfer device is less than the first threshold; and the full-bridge is configured to operate in a duty cycle control mode when the load current of the wireless power transfer device is greater than the first threshold.

20. The system of claim 18, wherein:

the full-bridge is configured to operate in a minimum phase-shifted control mode when the load current of the wireless power transfer device is less than the first threshold; and the full-bridge is configured to operate in a phase-shifted control mode when the load current of the wireless power transfer device is greater than the first threshold.

* * * * *